(12) United States Patent
Nepal et al.

(10) Patent No.: US 12,468,030 B2
(45) Date of Patent: Nov. 11, 2025

(54) RADAR SIGNAL PROCESSING IN ADVANCED DRIVER ASSISTANCE SYSTEMS

(71) Applicant: Alps Alpine Co., Ltd., Tokyo (JP)

(72) Inventors: Ramesh Nepal, Auburn Hills, MI (US); Justin Hopkins, Orion Township, MI (US); Harley Pawley, Clarkston, MI (US); Nathan Vargo, Rochester Hills, MI (US)

(73) Assignee: Alps Alpine Co., Ltd. (JP)

( * ) Notice: Subject to any disclaimer, the term of this patent is extended or adjusted under 35 U.S.C. 154(b) by 299 days.

(21) Appl. No.: 18/226,318

(22) Filed: Jul. 26, 2023

(65) Prior Publication Data

US 2025/0035778 A1    Jan. 30, 2025

(51) Int. Cl.
*G01S 13/931* (2020.01)
*G01S 7/41* (2006.01)

(52) U.S. Cl.
CPC .......... *G01S 13/931* (2013.01); *G01S 7/414* (2013.01)

(58) Field of Classification Search
None
See application file for complete search history.

(56) References Cited

U.S. PATENT DOCUMENTS

| | | | |
|---|---|---|---|
| 4,684,950 A | 8/1987 | Long | |
| 5,451,961 A | 9/1995 | Rubin et al. | |
| 6,369,747 B1* | 4/2002 | Ashihara | G01S 13/931 |
| | | | 702/183 |
| 8,456,352 B2 | 6/2013 | Wood | |
| 8,854,248 B2 | 10/2014 | Paglieroni et al. | |
| 9,213,091 B2* | 12/2015 | Kishigami | G01S 13/582 |
| 2006/0244653 A1* | 11/2006 | Szajnowski | G01S 7/282 |
| | | | 342/204 |
| 2007/0109175 A1* | 5/2007 | Fukuda | G01S 13/931 |
| | | | 342/134 |
| 2008/0042894 A1* | 2/2008 | Kikuchi | G01S 7/411 |
| | | | 342/70 |

(Continued)

OTHER PUBLICATIONS

International Search Report and Written Opinion issued in the corresponding International Application No. PCT/US2024/25086; mailed on Jul. 24, 2024 (total 9 pages).

*Primary Examiner* — Bernarr E Gregory
(74) *Attorney, Agent, or Firm* — Harness, Dickey & Pierce, P.L.C.

(57) ABSTRACT

An advanced driver assistance system (ADAS) radar includes at least one transmit antenna coupled with a vehicle, the at least one transmit antenna configured to transmit radar signals from the vehicle towards a scene of interest, at least one receive antenna coupled with the vehicle, the at least one receive antenna configured to receive reflected radar signals, and at least one processor. The processor is configured to execute computer-executable instructions to obtain multiple time-samples of the reflected radar signals from the at least one receive antenna at specified periodic intervals, execute an auto-correlation algorithm on the obtained multiple time-samples, normalize a ratio of zeroth lag and first lag according to an output of the auto-correlation algorithm, and compare the normalized ratio of the zeroth lag and the first lag to a specified threshold, to determine whether the reflected radar signals include an identified road clutter object.

20 Claims, 5 Drawing Sheets

(56) References Cited

U.S. PATENT DOCUMENTS

| | | | |
|---|---|---|---|
| 2009/0135053 A1* | 5/2009 | Negoro | H04B 1/707 342/195 |
| 2010/0194627 A1* | 8/2010 | Negoro | G01S 13/325 342/179 |
| 2014/0145872 A1* | 5/2014 | Shirakawa | G01S 13/325 342/132 |
| 2015/0168540 A1* | 6/2015 | Morita | G01S 13/0209 342/21 |
| 2016/0223644 A1* | 8/2016 | Soga | G01S 13/931 |
| 2016/0238694 A1* | 8/2016 | Kishigami | G01S 13/931 |
| 2017/0212213 A1* | 7/2017 | Kishigami | G01S 13/284 |
| 2017/0299711 A1* | 10/2017 | Kishigami | G01S 13/931 |
| 2018/0088224 A1* | 3/2018 | Kishigami | G01S 13/931 |
| 2019/0154793 A1 | 5/2019 | Kim | |
| 2020/0153907 A1 | 5/2020 | Davis et al. | |
| 2022/0289176 A1 | 9/2022 | Baek | |

\* cited by examiner

RADAR SIGNAL PROCESSING IN ADVANCED DRIVER ASSISTANCE SYSTEMS

FIELD

The present disclosure relates to systems and methods for radar signal processing in advanced driver assistance systems (ADASs).

BACKGROUND

For stationary radar, road or ground reflection (or ground clutter) appears at zero doppler, so a notch filter is often used to filter the road or ground reflection. Another method, clutter mapping, may be performed where static reflections are measured during an absence of targets. For airborne radar, ground clutter may be a problem, although resolution volume is generally larger, and there may be valid targets along with clutter, so a different approach is often taken. Separately, advanced driver assistance systems (ADASs) use radar to detect objects in front of a vehicle.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An advanced driver assistance system (ADAS) radar includes at least one transmit antenna coupled with a vehicle, the at least one transmit antenna configured to transmit radar signals from the vehicle towards a scene of interest, at least one receive antenna coupled with the vehicle, the at least one receive antenna configured to receive reflected radar signals, and at least one processor. The processor is configured to execute computer-executable instructions to obtain multiple time-samples of the reflected radar signals from the at least one receive antenna at specified periodic intervals, execute an auto-correlation algorithm on the obtained multiple time-samples, normalize a ratio of zeroth lag and first lag according to an output of the auto-correlation algorithm, and compare the normalized ratio of the zeroth lag and the first lag to a specified threshold, to determine whether the reflected radar signals include an identified road clutter object.

In other features, the ADAS radar includes a transmit hardware chain coupled between the transmit antenna and the at least one processor, a receive hardware chain coupled between the receive antenna and the at least one processor, and a local oscillator coupled between the transmit hardware chain and the receive hardware chain.

In other features, the transmit hardware chain includes a waveform generator, a mixer electrically coupled with an output of the waveform generator, a phase shifter electrically coupled with an output of the mixer, and a power amplifier electrically coupled with an output of the phase shifter.

In other features, the receive hardware chain includes a low noise amplifier, a mixer electrically coupled with an output of the low noise amplifier, a filter electrically coupled with an output of the mixer, and an analog to digital converter electrically coupled with an output of the filter.

In other features, the ADAS radar includes at least one of a circulator or a switch coupled with at least one of the transmit antenna and the receive antenna, a transmit hardware chain coupled between the at least one processor and the at least one of the circulator or the switch, a receive hardware chain coupled between the at least one processor and the at least one of the circulator or the switch, and a local oscillator coupled between the transmit hardware chain and the receive hardware chain.

In other features, the at least one processor is configured to process reflected radar signals which are received in a range from, for example, 0.5 meters to six meters, or any other suitable height range. In other features, the at least one processor is configured to determine that an identified road clutter object is included in the reflected radar signals in response to the normalized ratio of the zeroth lag and the first lag being above the specified threshold.

In other features, the at least one processor is configured to determine that an identified road clutter object is not included in the reflected radar signals in response to the normalized ratio of the zeroth lag and the first lag being below the specified threshold.

In other features, the specified threshold includes a value of one for the normalized ratio of zeroth lag and first lag. In other features, the ADAS radar includes memory hardware configured to store one or more downchain algorithms that may generate a clutter profile based on clutter radar signal characteristics, use a clutter profile for radar signal processing, etc.

In other features, the auto-correlation algorithm includes correlating the reflected radar signal with itself, and the reflected radar signal includes in-phase components and quadrature-phase components. In other features, an output of the auto-correlation algorithm may be used to identify a location of a maximum power of the identified road clutter object in the reflected radar signals.

In other features, normalizing the ratio of zeroth lag and first lag includes calculating a product of wavelengths of the reflected radar signals and a sampling frequency of the reflected radar signals. In other features, the at least one processor is configured to, in response to determining that the identified road clutter object is present in the reflected radar signals, remove the identified road clutter object from image processing or assign a low priority processing value to the identified road clutter object.

In other features, the auto-correlation algorithm may include convolution, a Fourier transform, multiplication, an inverse Fourier transform, or a combination thereof. In other features, a duration of each of the specified periodic intervals for obtaining the multiple time-samples of the reflected radar signals is in a range between 100 microseconds and 150 microseconds, and the at least one processor is configured to execute the auto-correlation algorithm on a number of the multiple time-samples in a range of 100 time-samples to 150 time-samples. In other features, the duration of each of the specified periodic intervals for obtaining the multiple time-samples of the reflected radar signals is 130 microseconds, and the number of the multiple time-samples for execution of the auto-correlation algorithm is 128 time-samples.

A method of processing reflected radar signals includes obtaining multiple time-samples of the reflected radar signals from the at least one receive antenna at specified periodic intervals, executing an auto-correlation algorithm on the obtained multiple time-samples, normalizing a ratio of zeroth lag and first lag according to an output of the auto-correlation algorithm, and comparing the normalized ratio of the zeroth lag and the first lag to a specified threshold, to determine whether the reflected radar signals include an identified road clutter object.

In other features, the method includes determining that an identified road clutter object is included in the reflected radar signals in response to the normalized ratio of the zeroth lag and the first lag being above the specified threshold. In other features, the method includes determining that an identified road clutter object is not included in the reflected radar signals in response to the normalized ratio of the zeroth lag and the first lag being below the specified threshold.

A computer-program product of processing reflected radar signals includes a non-transitory computer-readable medium storing instructions executable by a processor to obtain multiple time-samples of the reflected radar signals from at least one receive antenna at specified periodic intervals, execute an auto-correlation algorithm on the obtained multiple time-samples, normalize a ratio of zeroth lag and first lag according to an output of the auto-correlation algorithm, and compare the normalized ratio of the zeroth lag and the first lag to a specified threshold, to determine whether the reflected radar signals include an identified road clutter object.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
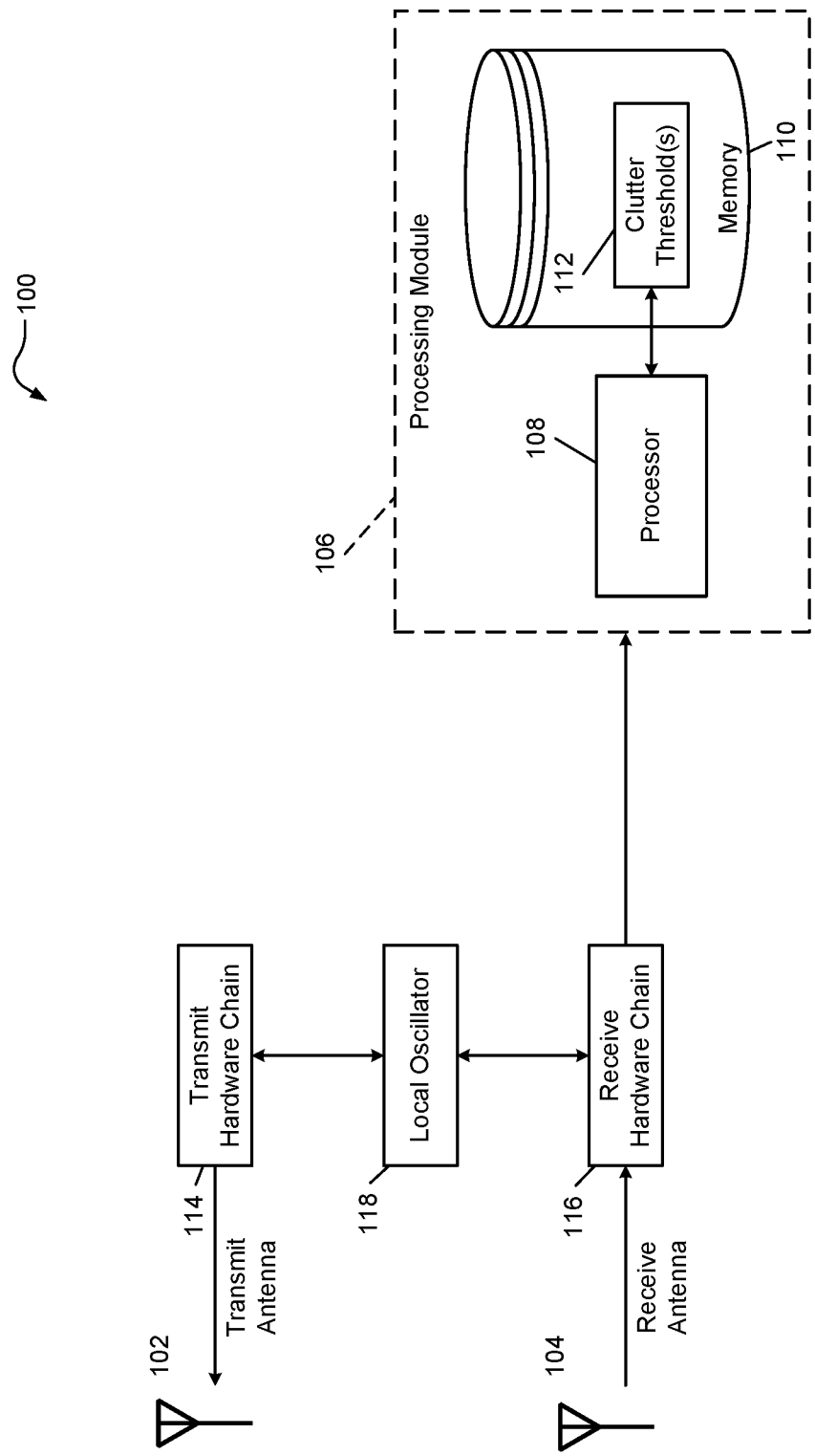
FIG. 1 is a functional block diagram of an example hardware configuration for radar signal processing in an advanced driver assistance system (ADAS).

A scene of radar illumination may include target objects of interest, and may also include clutter objects that are of little interest for the given application. For example, in advanced driver assistance system (ADAS) radars, road reflections may be categorized as clutter objects. Road clutter reflections waste computational time of a radar processing system, waste storage space and waste transfer bandwidth, and may cause valid target objects to be lost or missed.

In various example embodiments described herein, clutter identification algorithms may identify road reflections, and eliminate the road reflections completely from image processing analysis, place the road reflections at a low priority level, etc.

An ADAS radar system includes a transmit hardware chain. The transmit hardware chain may include, for example, an oscillator, frequency multipliers, frequency mixers, power amplifiers, power dividers, etc. The ADAS radar system includes a receive hardware chain. The receive hardware chain may include, for example, power amplifiers, frequency mixers, frequency filters, etc.

In some example embodiments, an ADAS radar system may include an antenna system configured to transmit and receive electro-magnetic waves, such as laser signals, light signals (e.g., a Lidar system), etc. In various implementations, the system may include one or more transmit antennas, one or more receive antennas, bidirectional antennas that operate a transmit antenna and a receive antenna, etc. The oscillator may be configured to provide a phase coherent reference for the transmitted and received signal.

The system may include one or more processors for performing mathematical operations, auto-correlation algorithms, normalization, etc. For example, the one or more processors (e.g., a processor module or processor hardware), may perform "integer-math", or "floating-point-math", with a capability of perform mathematical operations like correlation, addition, subtraction, multiplication, division, comparison, etc. The system may include memory hardware for storing algorithms, using an output of an auto-correlation algorithm to generate a clutter profiles associated with radar signal characteristics of road clutter objects, clutter detection threshold values, etc.

In some example embodiments, the processor may be configured to estimate whether received radar reflection signals are from a road surface or not. For example, algorithms may be directly used to estimate or identify whether received radar reflection signals are from road surface (indicating road clutter objects of little interest), or other targets of higher interest (such as larger objects like other vehicles or pedestrians). Detected road reflection data may be removed entirely from image processing, placed at a lower priority for image processing, etc.

As mentioned above, some example embodiments may include any suitable configuration of transmit chain hardware, receive chain hardware, antennas that have phase coherency (e.g., a fixed relationship between the transmitted signal and the reference signal), etc. A variety of mathematical operations may be implemented in some example software implementations, to obtain similar effects as alternative or combined hardware approaches.

An ADAS radar mounted on the front of a vehicle may be configured to detect oncoming traffic, but the radar may also constantly detect road reflection signals (e.g., in the z direction, for example, the road may be detected at a radar mounting height, such as 50 cm or below the radar). In some example embodiments, a processor may be configured to determine whether radar reflection signals are coming from one larger target (e.g., a person or a vehicle having a size of 10 cm or more), or a greater number of smaller targets (such as a number of small targets on a road each having a size of less than one millimeter). For example, imperfections in the road may scatter reflected radar signals and provide small changes from one radar transmission and reception to the next.

Example embodiments may use the road clutter detection algorithm to free up image processing bandwidth and storage, avoid false identification of objects, avoid missing a legitimate target object if limiting processing is available, etc. For example, alternative approaches that do not provide any signal detection below radar in height to avoid road clutter may miss legitimate target objects that are below, e.g., the 50 cm height level (or other suitable height cutoff value), such as a downslope radar scene.

In various implementations, identified targets in the reflected radar signals are placed in priority order for processing. Identified road clutter objects may be assigned a low priority. The processor may be focused on identifying the road clutter objects before filtering is applied, because filtering in various dimensions (e.g., an x direction, a y direction and a z direction), may be difficult or require a lot of processing. Multiple pulses of the radar signal transmission and reception may be used to deduce information about whether some reflected radar signals include road clutter objects. For example, in some prior approaches, road objects may be identified by processing information about a height of detected objects. In contrast, in some example embodiments the algorithm may determine road clutter objects earlier in the processing to avoid wasted bandwidth, storage, computation, etc.

Radar Signal Processing System

FIG. 1 is a functional block diagram of an example hardware configuration 100 for radar signal processing in an advanced driver assistance system (ADAS). As shown in FIG. 1, the hardware configuration 100 includes a transmit antenna 102, a receive antenna 104, and a processing module 106.

The processing module 106 includes at least one processor 108, and memory 110. The memory 110 may include, for example, one or more clutter thresholds 112 that can be used to identify detected road clutter objects in reflected radar signals.

The hardware configuration 100 includes a transmit hardware chain 114 electrically coupled with the transmit antenna 102. The transmit antenna 102 may be coupled to a vehicle (e.g., mounted adjacent a front of the vehicle), and may be configured to transmit radar signals from the vehicle towards a scene of interest (e.g., the radar may be facing forwards, backwards or sideways on a vehicle). For example, the scene of interest may be a view direction in front of the vehicle, a view direction behind or to the side of the vehicle, etc. An example of the transmit hardware chain 114 is described further below with reference to FIG. 3.

As shown in FIG. 1, the hardware configuration 100 includes a receive hardware chain 116 electrically coupled with the receive antenna 104. The receive antenna 104 may be coupled to the vehicle (e.g., mounted adjacent the front of the vehicle), and may be configured to receive reflected radar signals, such as reflections of radar signals transmitted by the transmit antenna 102. An example of the receive hardware chain 116 is described further below with reference to FIG. 3.

A local oscillator 118 is coupled between the transmit hardware chain 114 and the receive hardware chain 116. The local oscillator 118 may be configured to provide a phase coherent reference for the received signal of the receive hardware chain 116. Although FIG. 1 illustrates the receive hardware chain 116 electrically coupled with the processing module 106, in other embodiments the transmit hardware chain 114 may be electrically coupled with the processing module 106, in addition to or separate from the receive hardware chain 116.

Figure 2:
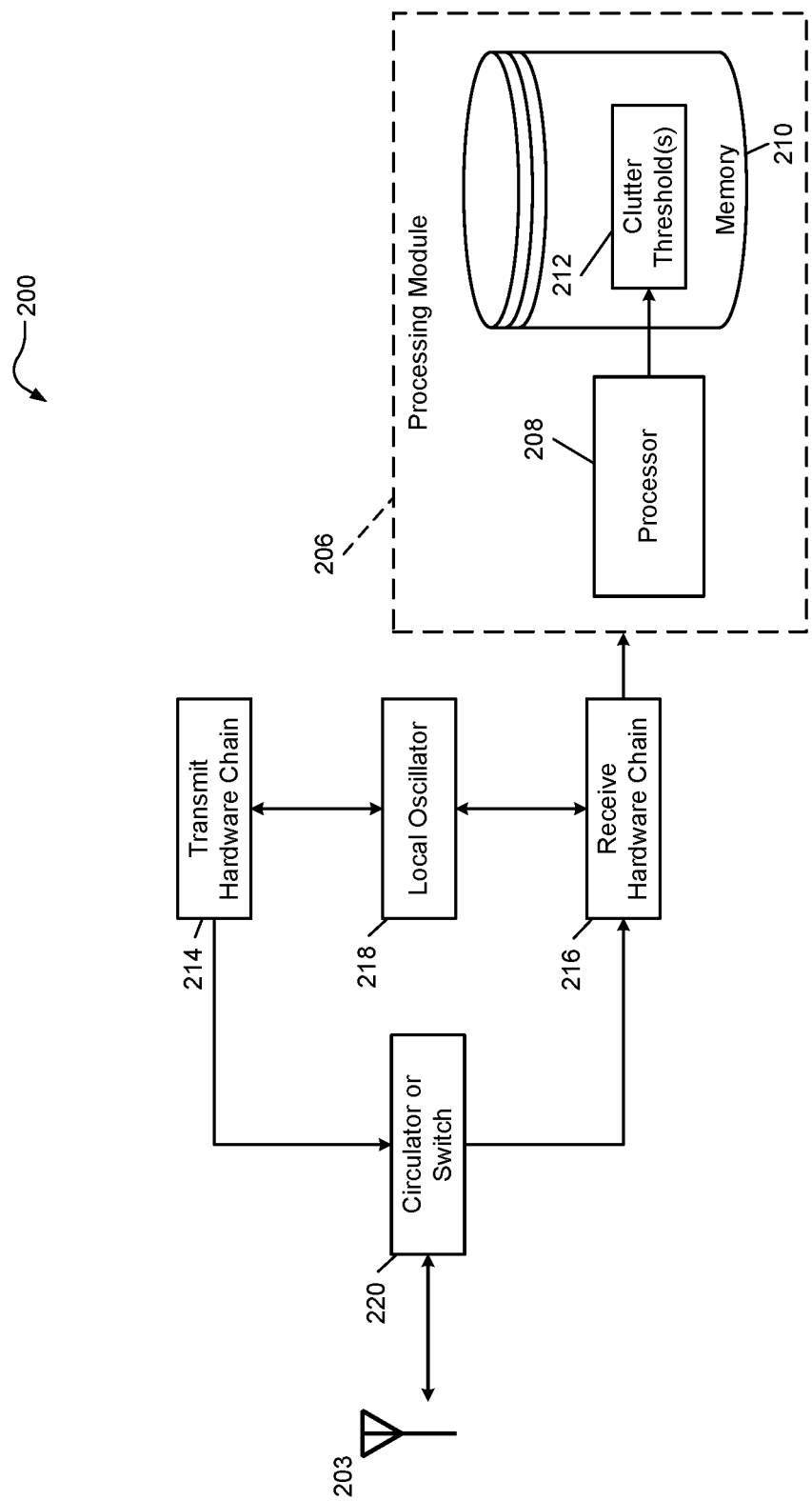
FIG. 2 is a functional block diagram of another example hardware configuration for radar signal processing in an advanced driver assistance system (ADAS).

FIG. 2 is a functional block diagram of another example hardware configuration 200 for radar signal processing in an advanced driver assistance system (ADAS). As shown in FIG. 2, the hardware configuration 200 includes an antenna 203 and a processing module 206.

The processing module 206 includes at least one processor 208, and memory 210. The memory 210 may include, for example, one or more clutter profiles 212 that can be used to identify detected road clutter objects in reflected radar signals.

The antenna 203 may include a transmit antenna, a receive antenna, a bidirectional antenna including both a transmit antenna and a receive antenna, etc. The antenna 203 may be coupled to a vehicle, such as mounting at a front of the vehicle.

At least one circulator and/or switch 220 is coupled with the antenna 203. For example, the antenna 203 may be configured to transmit radar signals in front of the vehicle, and/or to receive reflected radar signals, such as reflections of radar signals transmitted by the antenna 203. The circulator and/or switch 220 may be configured to switch control of the antenna 203 between a radar signal transmission mode of operation and a reflected radar signal reception mode of operation.

The hardware configuration 200 includes a transmit hardware chain 214 electrically coupled with the circulator and/or switch 220. An example of the transmit hardware chain 214 is described further below with reference to FIG. 3. As shown in FIG. 2, the hardware configuration 200 also includes a receive hardware chain 216 electrically coupled with the circulator and/or switch 220. An example of the receive hardware chain 216 is described further below with reference to FIG. 3.

A local oscillator 218 is coupled between the transmit hardware chain 214 and the receive hardware chain 216. The local oscillator 218 may be configured to provide a phase coherent reference for the received signal of the receive hardware chain 216. Although FIG. 2 illustrates the receive hardware chain 216 electrically coupled with the processing module 206, in other embodiments the transmit hardware chain 214 may be electrically coupled with the processing module 206, in addition to or separate from the receive hardware chain 216.

Figure 3:
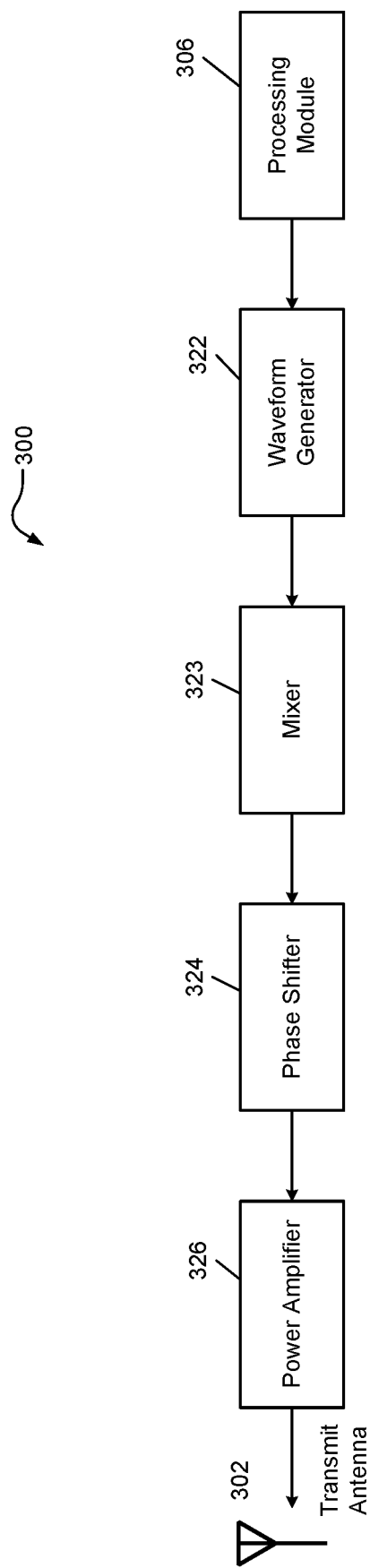
FIG. 3 is a functional block diagram of an example transmit hardware chain of the system of FIG. 1 or FIG. 2.

FIG. 3 is a functional block diagram of an example transmit hardware chain 300, which may be similar to the transmit hardware chain 114 of FIG. 1 or the transmit hardware chain 214 of FIG. 2. As shown in FIG. 3, the processing module 306 controls a waveform generator 322 to generate a radar signal waveform.

The output of the waveform generator 322 is electrically coupled to a mixer 323. The mixer 323 may be configured to mix signals, fix frequencies, etc.

An output of the mixer 323 is electrically coupled to a phase shifter 324. The phase shifter 324 may be configured to shift a phase of a radar signal waveform generated by the waveform generator 322. An output of the phase shifter 324 is electrically coupled to the power amplifier 326.

The power amplifier 326 may be configured to amplify a phase shifted waveform from the phase shifter 324, and supply the amplified signal to the transmit antenna 302 (e.g., for transmitting a radar signal in front of the vehicle). Although FIG. 3 illustrates one example embodiment of a transmit hardware chain, other embodiments may include more or less components, hardware components electrically coupled in a different suitable arrangement for generating radar transmission signals, etc.

Figure 4:
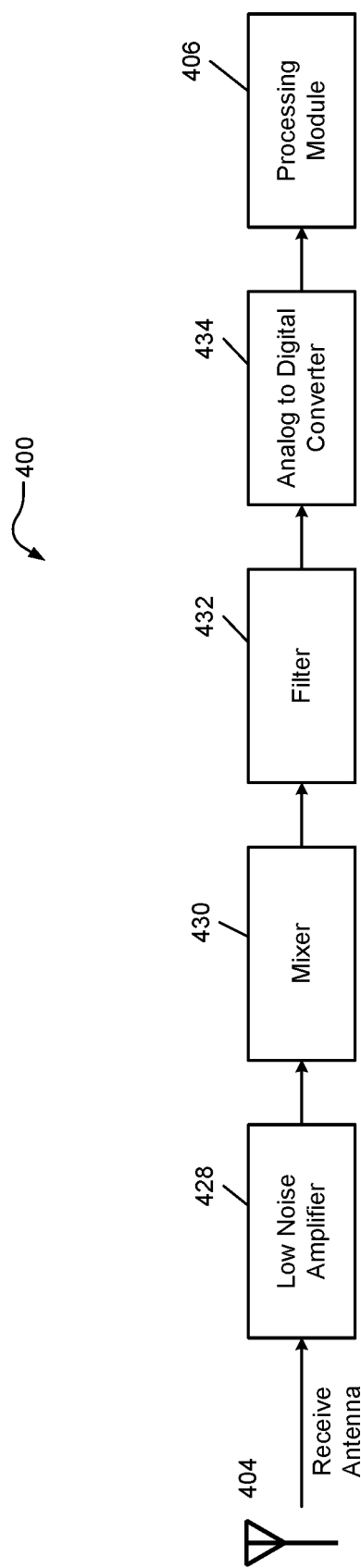
FIG. 4 is a functional block diagram of an example receive hardware chain of the system of FIG. 1 or FIG. 2.

FIG. 4 is a functional block diagram of an example receive hardware chain 400, which may be similar to the receive hardware chain 116 of FIG. 1 or the receive hardware chain 216 of FIG. 2. As shown in FIG. 4, the receive antenna 404 is configured to supply received radar reflection signals to a low noise amplifier 428.

The low noise amplifier 428 is configured to amplify the radar reflection signals received by the receive antenna 404, and supply the amplified signals to a mixer 430. The mixer 430 is configured to mix the amplified signals, and supply the mixed signals to a filter 432.

As shown in FIG. 4, the filter 432 is configured to filter the mixed signals received from the mixer 430, and supply the filtered signals to an analog to digital converter 434. The analog to digital converter 434 is configured to convert the analog filtered signals received from the filter 432 into a digital signal, and supply the digital signal to the processing module 406. Although FIG. 4 illustrates one example embodiment of a receive hardware chain, other embodiments may include more or less components, hardware components electrically coupled in a different suitable arrangement for receiving reflected radar signals, etc.

Radar Signal Processing Method

Figure 5:
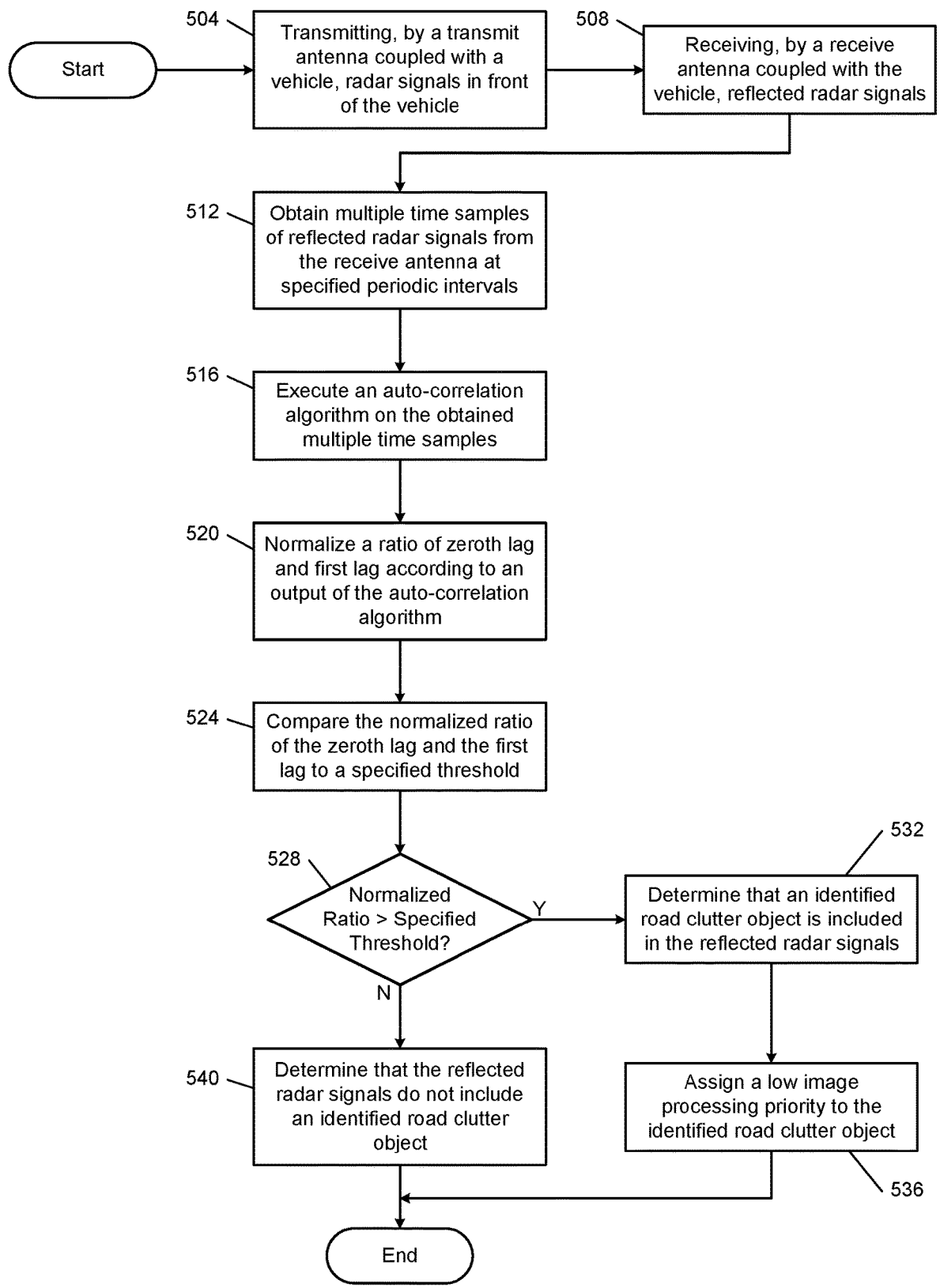
FIG. 5 is a flowchart depicting an example method of radar signal processing in an advanced driver assistance system (ADAS).

FIG. 5 is a flowchart depicting an example method of radar signal processing in an advanced driver assistance system (ADAS). The method may be performed by, for example, the processing module 106 of FIG. 1 or the processing module 206 of FIG. 2.

The process begins at 504 by transmitting, via a transmit antenna coupled with a vehicle (such as the transmit antenna 102 of FIG. 1 or the transmit antenna 202 of FIG. 2), radar signals in front of the vehicle. At 508, the process includes receiving, via a receive antenna coupled with the vehicle (such as the receive antenna 104 of FIG. 1 or the receive antenna 204 of FIG. 2), reflected radar signals.

At 512, the processing module may be configured to obtain multiple time-samples of reflected radar signals from the receive antenna at specified periodic intervals. For example, from a physics point of view, receiving multiple samples over periodic intervals allows the processing module to determine what the phase distribution looks like for the reflected radar signals.

Any suitable periodic intervals may be used, such as periodic intervals having a duration within a range of 100 microseconds to 150 microseconds (e.g., about 130 microseconds). Any suitable number of time-samples of the reflected radar signals may be obtained for further processing as described below, such as a number of time-samples in a range from 100 time-samples to 150 time-samples (e.g., about 128 time-samples).

At 516, the processing module is configured to execute an auto-correlation algorithm on the obtained multiple time-samples. Any suitable method for auto-correlation may be used, such as convolution, a Fourier transform, multiplication, an inverse Fourier transform, or a combination thereof.

An end result of the auto-correlation algorithm may include a ratio of a zeroth lag and a first lag. For example, the auto-correlation algorithm may correlate one cell, where one signal is overlapped with another (e.g., use a same reflected radar signal twice, multiply the signal and calculate a sum, and then shift by one).

If a length of a reflected radar signal is L, the auto-correlation algorithm may execute a shift by L−1, then shift by a factor of 1 and overlap the shifted signal, to perform multiplication and calculate a sum. This process may be repeated until an overlap occurs (e.g., a zeroth lag). The shifting may be continued, although it may not be necessary in cases where the overlapping signal is a same reflected radar signal.

A zeroth lag may refer to completely overlapping reflected radar signals, and a first lag may refer to one shift over in the overlapping reflected radar signals. For example, each of 128 samples may be multiplied with itself, then the results summed, to calculate a zero lag. In the first lag, sample 1 may be multiplied with sample 2 and then summed, etc.

At 520, the processing module is configured to normalize a ratio of zeroth lag and first lag according to an output of the auto-correlation algorithm. For example, a sampling frequency may be considered as an inverse of a time period between samples of the reflected radar signal. In order to negate an effect of time between the samples, zeroth and first lag may be normalized.

In this manner, a same or similar threshold for identifying road clutter may be used for different systems with different wavelengths or sampling parameters. For example, a same or similar threshold may be used if the sampling frequency is the only parameter changed between systems. Normalization may include using an exponential function to normalize the ratio of the zeroth lag and the first lag, and may include a product of radar signal wavelength and the sampling frequency.

At 524, the processing module is configured to compare a normalized ratio of the zeroth lag and the first lag to a specified threshold. For example, if A is the zeroth lag and B is the first lag, a ratio of A/B may be compared to a specified threshold value. An example threshold value may be, e.g., one in a case where the ratio of the zeroth lag and the first lag is normalized. In an example embodiment where the ratio is not normalized, the specified threshold may be, e.g., about 0.18.

If the ratio of the zeroth lag and the first lag is greater than the specified threshold value, the processing module may determine that the reflected radar signals include a detected road clutter object. If the ratio of the zeroth lag and the first lag is less than the specified threshold value, the processing module may determine that the reflected radar signals include a true target object (e.g., the reflected radar signals do not include a road clutter object).

For example, the processing module may use the ratio to determine if one identified target is present (e.g., suggesting a true target object), or if a lot of scatter objects are present (e.g., suggesting road clutter objects of no interest). From a physics point of view, a wider distribution of phases is indicative of more scattered targets, while a narrower distribution of phases is indicative of a single target in the reflected radar signals.

The ratio of zeroth lag to the first lag may be considered as indicating how much the phase changes from one pulse/chirp of the radar signals to the next. A larger ratio may indicate that there is greater variance from one pulse to the next, which may happen when there are a number of smaller targets of road clutter. In contrast, a larger true target object may provide a more stable reflection with less variation between pulses, leading to a smaller ratio below the specified threshold value.

Referring again to FIG. 5, if the processing module determines at 528 that the normalized ratio of zeroth lag to first lag is greater than the specified threshold, control proceeds to 532 to determine that an identified road clutter object is included in the reflected radar signals. Control then assigns a low image processing priority to the identified road clutter object at 536.

If the processing module determines at 528 that the ratio of the zeroth lag to the first lag is less than the specified threshold, control proceeds to 540 to determine that the reflected radar signals do not include an identified road clutter object.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An advanced driver assistance system (ADAS) radar comprising:
    at least one transmit antenna coupled with a vehicle, the at least one transmit antenna configured to transmit radar signals from the vehicle towards a scene of interest;
    at least one receive antenna coupled with the vehicle, the at least one receive antenna configured to receive reflected radar signals; and
    at least one processor configured to execute computer-executable instructions to:
        obtain multiple time-samples of the reflected radar signals from the at least one receive antenna at specified periodic intervals;
        execute an auto-correlation algorithm on the obtained multiple time-samples;
        normalize a ratio of zeroth lag and first lag according to an output of the auto-correlation algorithm; and
        compare the normalized ratio of the zeroth lag and the first lag to a specified threshold, to determine whether the reflected radar signals include an identified road clutter object.

2. The ADAS radar of claim 1, further comprising:
    a transmit hardware chain coupled between the transmit antenna and the at least one processor;
    a receive hardware chain coupled between the receive antenna and the at least one processor; and
    a local oscillator coupled between the transmit hardware chain and the receive hardware chain.

3. The ADAS radar of claim 2, wherein the transmit hardware chain includes:
    a waveform generator;
    a mixer electrically coupled with an output of the waveform generator;
    a phase shifter electrically coupled with an output of the mixer; and
    a power amplifier electrically coupled with an output of the phase shifter.

4. The ADAS radar of claim 2, wherein the receive hardware chain includes:
    a low noise amplifier;
    a mixer electrically coupled with an output of the low noise amplifier;
    a filter electrically coupled with an output of the mixer; and
    an analog to digital converter electrically coupled with an output of the filter.

5. The ADAS radar of claim 1, further comprising:
    at least one of a circulator or a switch coupled with at least one of the transmit antenna and the receive antenna;
    a transmit hardware chain coupled between the at least one processor and the at least one of the circulator or the switch;
    a receive hardware chain coupled between the at least one processor and the at least one of the circulator or the switch; and
    a local oscillator coupled between the transmit hardware chain and the receive hardware chain.

6. The ADAS radar of claim 1, wherein the at least one processor is configured to process reflected radar signals which are received from the radar field of view.

7. The ADAS radar of claim 1, wherein the at least one processor is configured to determine that an identified road clutter object is included in the reflected radar signals in response to the normalized ratio of the zeroth lag and the first lag being above the specified threshold.

8. The ADAS radar of claim 7, wherein the at least one processor is configured to determine that an identified road clutter object is not included in the reflected radar signals in response to the normalized ratio of the zeroth lag and the first lag being below the specified threshold.

9. The ADAS radar of claim 8, wherein the specified threshold includes a value of one for the normalized ratio of zeroth lag and first lag.

10. The ADAS radar of claim 1, further comprising memory hardware configured to store one or more down-chain algorithms which generate a clutter profile based on clutter radar signal characteristics, or use a stored clutter profile for radar signal processing.

11. The ADAS radar of claim 1, wherein the auto-correlation algorithm includes correlating the reflected radar signal with itself, and the reflected radar signal includes in-phase components and quadrature-phase components.

12. The ADAS radar of claim 1, wherein normalizing the ratio of zeroth lag and first lag includes calculating a product of wavelengths of the reflected radar signals and a sampling frequency of the reflected radar signals.

13. The ADAS radar of claim 1, wherein the at least one processor is configured to, in response to determining that the identified road clutter object is present in the reflected radar signals, remove the identified road clutter object from image processing or assign a low priority processing value to the identified road clutter object.

14. The ADAS radar of claim 1, wherein the auto-correlation algorithm includes at least one of convolution, a Fourier transform, multiplication, an inverse Fourier transform.

15. The ADAS radar of claim 1, wherein:
a duration of each of the specified periodic intervals for obtaining the multiple time-samples of the reflected radar signals is in a range between 100 microseconds and 150 microseconds; and
the at least one processor is configured to execute the auto-correlation algorithm on a number of the multiple time-samples in a range of 100 time-samples to 150 time-samples.

16. The ADAS radar of claim 15, wherein:
the duration of each of the specified periodic intervals for obtaining the multiple time-samples of the reflected radar signals is 130 microseconds; and
the number of the multiple time-samples for execution of the auto-correlation algorithm is 128 time-samples.

17. A method of processing reflected radar signals, the method comprising:
obtaining multiple time-samples of the reflected radar signals from at least one receive antenna at specified periodic intervals;
executing an auto-correlation algorithm on the obtained multiple time-samples;
normalizing a ratio of zeroth lag and first lag according to an output of the auto-correlation algorithm; and
comparing the normalized ratio of the zeroth lag and the first lag to a specified threshold, to determine whether the reflected radar signals include an identified road clutter object.

18. The method of claim 17, further comprising determining that an identified road clutter object is included in the reflected radar signals in response to the normalized ratio of the zeroth lag and the first lag being above the specified threshold.

19. The method of claim 18, further comprising determining that an identified road clutter object is not included in the reflected radar signals in response to the normalized ratio of the zeroth lag and the first lag being below the specified threshold.

20. A computer-program product of processing reflected radar signals, the computer-program product comprising a non-transitory computer-readable medium storing instructions executable by a processor to:
obtain multiple time-samples of the reflected radar signals from at least one receive antenna at specified periodic intervals;
execute an auto-correlation algorithm on the obtained multiple time-samples;
normalize a ratio of zeroth lag and first lag according to an output of the auto-correlation algorithm; and
compare the normalized ratio of the zeroth lag and the first lag to a specified threshold, to determine whether the reflected radar signals include an identified road clutter object.

* * * * *